United States Patent
Stoller et al.

(10) Patent No.: US 12,543,633 B2
(45) Date of Patent: Feb. 10, 2026

(54) SPRAYER SYSTEM

(71) Applicant: Precision Planting LLC, Tremont, IL (US)

(72) Inventors: Jason J. Stoller, Eureka, IL (US); Paul Wildermuth, Tremont, IL (US); Nicholas Winkler, Gurnee, IL (US)

(73) Assignee: Precision Planting LLC, Tremont, IL (US)

( * ) Notice: Subject to any disclaimer, the term of this patent is extended or adjusted under 35 U.S.C. 154(b) by 274 days.

(21) Appl. No.: 17/932,141

(22) PCT Filed: Jun. 16, 2021

(86) PCT No.: PCT/IB2021/055310
§ 371 (c)(1),
(2) Date: Sep. 14, 2022

(87) PCT Pub. No.: WO2022/009001
PCT Pub. Date: Jan. 13, 2022

(65) Prior Publication Data
US 2023/0356249 A1    Nov. 9, 2023

Related U.S. Application Data

(60) Provisional application No. 63/050,315, filed on Jul. 10, 2020, provisional application No. 63/050,314, filed on Jul. 10, 2020.

(51) Int. Cl.
B05B 12/08    (2006.01)
A01C 23/04    (2006.01)
B05B 1/20    (2006.01)

(52) U.S. Cl.
CPC .............. *A01C 23/047* (2013.01); *B05B 1/20* (2013.01); *B05B 12/082* (2013.01)

(58) Field of Classification Search
CPC . A01M 7/0089; A01M 7/0096; A01C 23/047; B05B 1/20; B05B 12/006; B05B 12/082
See application file for complete search history.

(56) References Cited

U.S. PATENT DOCUMENTS

| | | |
|---|---|---|
| 10,255,670 B1 | 4/2019 | Wu et al. |
| 10,564,259 B2 | 2/2020 | Hien et al. |
| (Continued) | | |

FOREIGN PATENT DOCUMENTS

| | | |
|---|---|---|
| CN | 105957087 A | 9/2016 |
| CN | 108402021 A | 8/2018 |
| (Continued) | | |

OTHER PUBLICATIONS

European Patent Office, International Search Report related to International Patent Application No. PCT/IB2021/055310, mail date Sep. 17, 2021.

(Continued)

*Primary Examiner* — Ricky Go

(57) ABSTRACT

A spraying system that includes at least one camera to determine for at least one nozzle spray angle, average of spray angle, standard deviation of spray angle, relative pressure, absolute pressure, relative flow rate, absolute flow rate, percent plugged, and/or spray pattern uniformity/variability of the spray from the at least one nozzle.

18 Claims, 7 Drawing Sheets

(56) References Cited

U.S. PATENT DOCUMENTS

| | | |
|---|---|---|
| 2004/0131243 A1 | 7/2004 | Farina |
| 2005/0000277 A1* | 1/2005 | Giles ................... A01M 7/0089 |
| | | 73/114.51 |
| 2007/0210182 A1* | 9/2007 | Wulteputte ........... B05B 7/0416 |
| | | 239/398 |
| 2008/0114497 A1* | 5/2008 | Giles ....................... B05B 15/50 |
| | | 700/283 |
| 2010/0225912 A1 | 9/2010 | Sivathanu |
| 2015/0351375 A1* | 12/2015 | Ni ......................... A01M 7/005 |
| | | 239/147 |
| 2016/0368011 A1* | 12/2016 | Feldhaus ............... B05B 12/124 |
| 2017/0024870 A1* | 1/2017 | Reichhardt ......... A01M 7/0089 |
| 2017/0080445 A1 | 3/2017 | Posselius et al. |
| 2018/0052088 A1* | 2/2018 | Sarkar ................ G01N 15/0227 |
| 2019/0049360 A1 | 2/2019 | Crafton et al. |
| 2019/0257678 A1 | 8/2019 | Posselius |
| 2019/0358661 A1* | 11/2019 | Bharatiya ........... A01M 7/0096 |
| 2021/0308708 A1* | 10/2021 | Stanhope ................. B05B 1/20 |
| 2021/0323015 A1* | 10/2021 | Harmon .............. A01M 7/0042 |
| 2022/0061304 A1* | 3/2022 | Bachman ............ A01M 21/043 |

FOREIGN PATENT DOCUMENTS

| | | |
|---|---|---|
| CN | 109978905 A | 7/2019 |
| DE | 102016109406 A1 | 11/2017 |
| DE | 102018125168 A1 | 4/2020 |
| EP | 1961300 A2 | 8/2008 |

OTHER PUBLICATIONS

UK Intellectual Property Office, Search report for related UK Application No. GB2011241.3, dated Jan. 4, 2021.

\* cited by examiner

SPRAYER SYSTEM

CROSS REFERENCE TO RELATED APPLICATIONS

This application is a national stage entry of International Application No. PCT/IB2021/055310, filed 16 Jun. 2021, which claims priority to U.S. Provisional Application Nos. 63/050,315, filed 10 Jul. 2020; and 63/050,314, filed 10 Jul. 2020, the disclosures of all are incorporated herein by reference in their entireties.

BACKGROUND

Spraying systems can be used on many different types of agricultural implements, such as a sprayer, a side-dress bar, a planter, a seeder, an irrigator, a center pivot irrigator, a tillage implement, a tractor, a cart, or a robot. There are sensors in these spraying systems that measure flow rate and/or pressure throughout the spraying system up to the point of discharge from a nozzle. It would be advantageous to further assess a spraying system by measuring the discharge from the nozzles.

DETAILED DESCRIPTION

All references cited herein are incorporated herein in their entireties. If there is a conflict between a definition herein and in an incorporated reference, the definition herein shall control.

Figure 1:
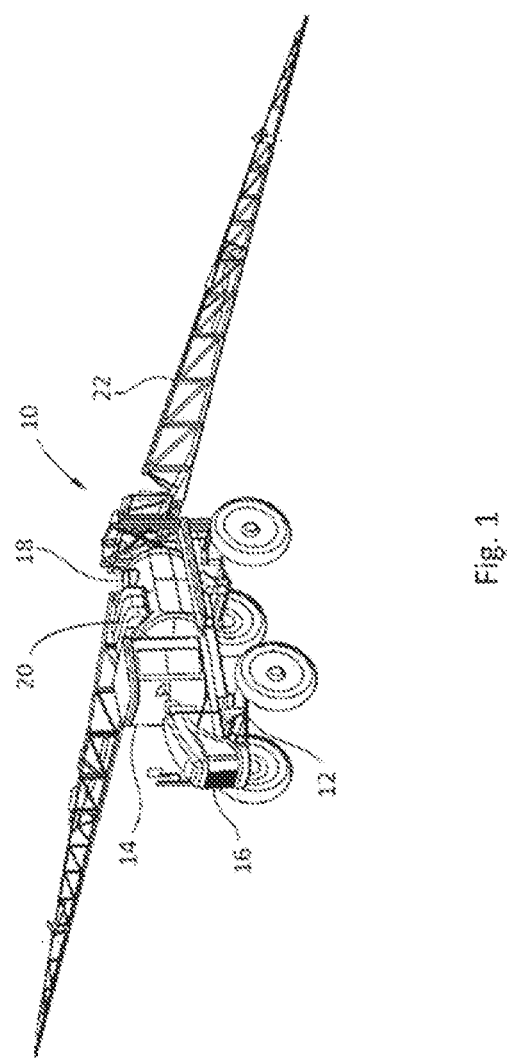
FIG. 1 is an illustration of an agricultural crop sprayer.

Referring to the drawings, wherein like reference numerals designate identical or corresponding parts throughout the several views, FIG. 1 illustrates an agricultural implement, such as a sprayer 10. While the system can be used on a sprayer, the system can be used on any agricultural implement that is used to apply fluid to soil, such as a side-dress bar, a planter, a seeder, an irrigator, a center pivot irrigator, a tillage implement, a tractor, a cart, or a robot. A reference to boom or boom arm herein includes corresponding structures, such as a toolbar, in other agricultural implements.

FIG. 1 shows an agricultural crop sprayer 10 used to deliver chemicals to agricultural crops in a field. Agricultural sprayer 10 comprises a chassis 12 and a cab 14 mounted on the chassis 12. Cab 14 may house an operator and a number of controls for the agricultural sprayer 10. An engine 16 may be mounted on a forward portion of chassis 12 in front of cab 14 or may be mounted on a rearward portion of the chassis 12 behind the cab 14. The engine 16 may comprise, for example, a diesel engine or a gasoline powered internal combustion engine. The engine 16 provides energy to propel the agricultural sprayer 10 and also can be used to provide energy used to spray fluids from the sprayer 10.

Although a self-propelled application machine is shown and described hereinafter, it should be understood that the embodied invention is applicable to other agricultural sprayers including pull-type or towed sprayers and mounted sprayers, e.g. mounted on a 3-point linkage of an agricultural tractor.

The sprayer 10 further comprises a liquid storage tank 18 used to store a spray liquid to be sprayed on the field. The spray liquid can include chemicals, such as but not limited to, herbicides, pesticides, and/or fertilizers. Liquid storage tank 18 is to be mounted on chassis 12, either in front of or behind cab 14. The crop sprayer 10 can include more than one storage tank 18 to store different chemicals to be sprayed on the field. The stored chemicals may be dispersed by the sprayer 10 one at a time or different chemicals may be mixed and dispersed together in a variety of mixtures. The sprayer 10 further comprises a rinse water tank 20 used to store clean water, which can be used for storing a volume of clean water for use to rinse the plumbing and main tank 18 after a spraying operation.

At least one boom arm 22 on the sprayer 10 is used to distribute the fluid from the liquid tank 18 over a wide swath as the sprayer 10 is driven through the field. The boom arm 22 is provided as part of a spray applicator system, which further comprises an array of spray nozzles (described later) arranged along the length of the boom arm 22 and suitable sprayer plumping used to connect the liquid storage tank 18 with the spray nozzles. The sprayer plumping will be understood to comprise any suitable tubing or piping arranged for fluid communication on the sprayer 10.

Illustrated in FIGS. 2 to 9, there are a plurality of nozzles 50 (50-1 to 50-12) disposed on boom arm 22. While illustrated with 12 nozzles 50, there can be any number of nozzles 50 disposed on boom arm 22. Nozzles 50 dispense material (such as fertilizer, herbicide, or pesticide) in a spray. In any of the embodiments, nozzles 50 can be actuated with a pulse width modulation (PWM) actuator to turn the nozzles 50 on and off.

Figure 11:
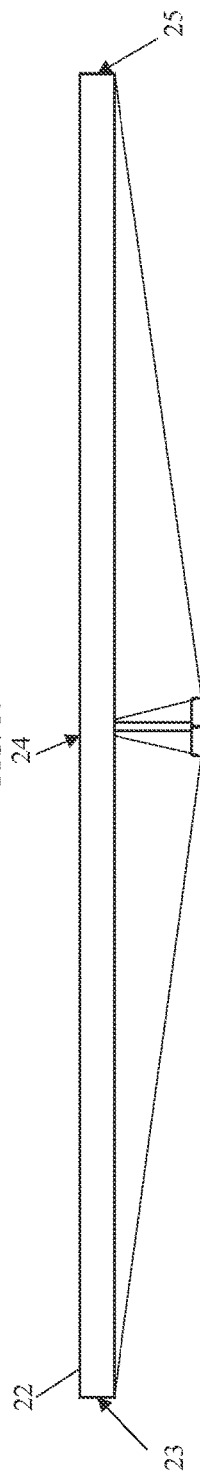
FIG. 11 is a top plan view of a spray boom with cameras as in FIGS. 2 to 5.
Figure 12:
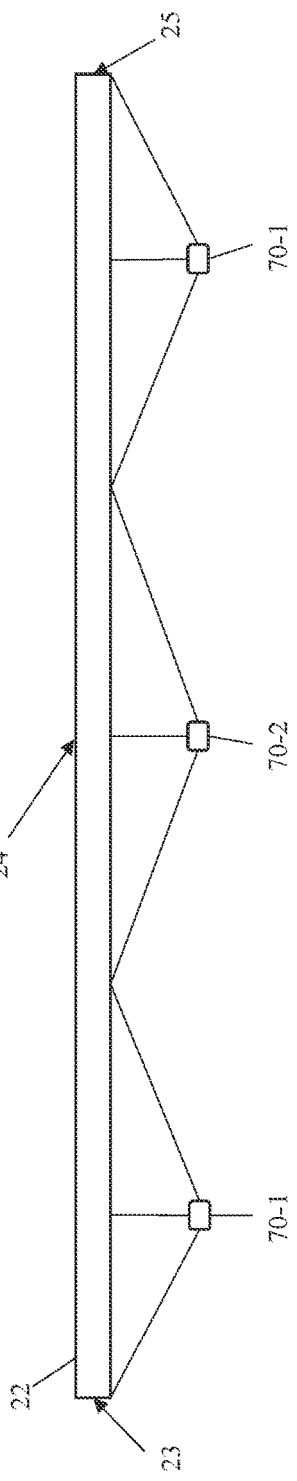
FIG. 12 is a top plan view of a spray boom with cameras as in FIGS. 6 to 9.

Illustrated in FIGS. 2 to 5, there are two cameras 70 (70-1 and 70-2) disposed on the boom arm 22 with each camera 70-1 and 70-2 disposed to view half of the boom arm 22 as seen in FIG. 11. Illustrated in FIGS. 6 to 9, there are a plurality of cameras 70 (70-1, 70-2, 70-3) each disposed on the boom arm 22 with each viewing a subsection of boom arm 22 as seen in FIG. 12. While illustrated with three cameras 70, there can be additional cameras 70. In the plurality of camera 70 embodiments, the cameras 70 can each be disposed to view an equal number of nozzles 50 or any number of nozzles 50.

Figure 2:
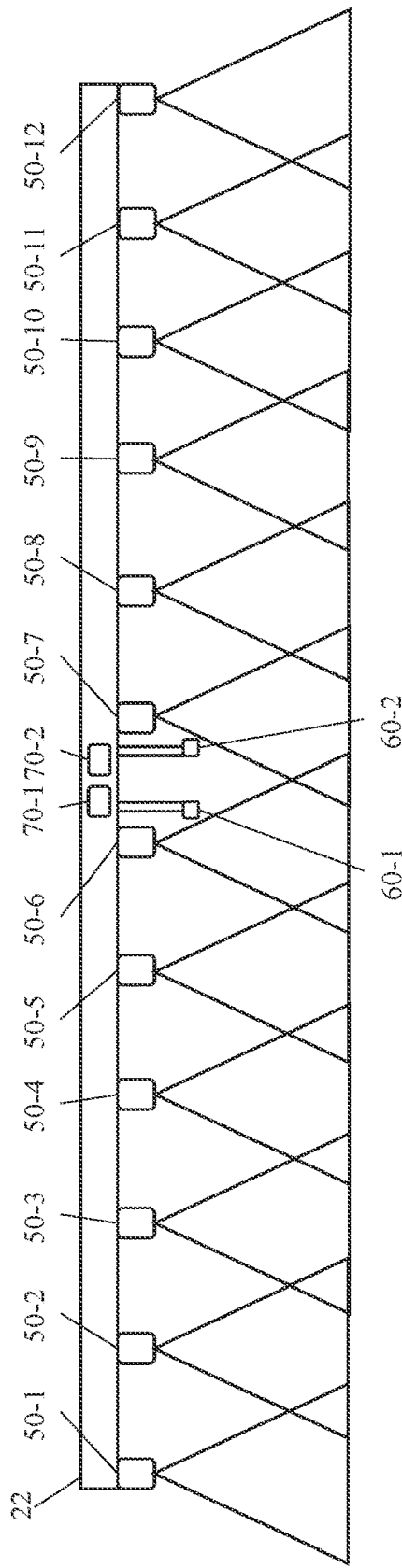
FIG. 2 is a rear elevation view of a spray boom with cameras and lights according to one embodiment.
Figure 6:
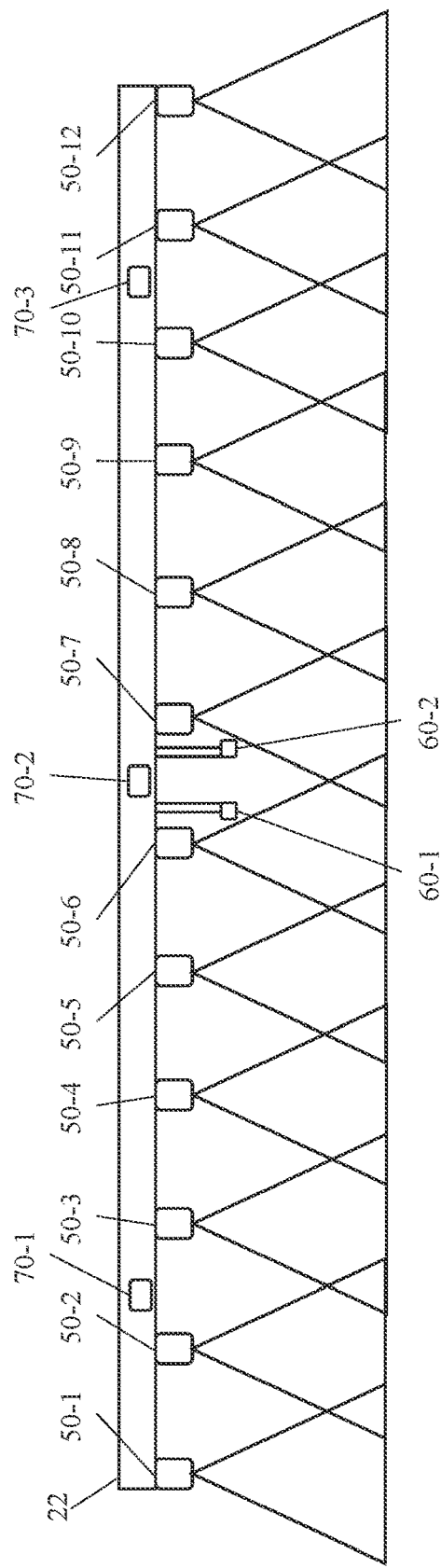
FIG. 6 is a rear elevation view of a spray boom with cameras and lights according to one embodiment.

FIGS. 2 and 6 illustrate two lights 60 (60-1, 60-2) that are disposed at a middle (24) of the boom arm 22 and disposed to each illuminate towards ends (23, 25) of boom arm 22.

Figure 3:
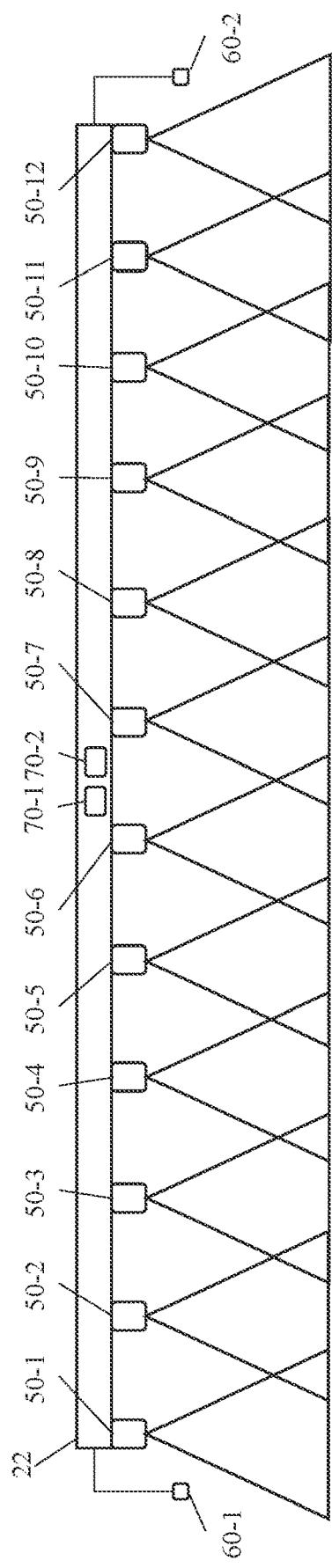
FIG. 3 is a rear elevation view of a spray boom with cameras and lights according to one embodiment.
Figure 7:
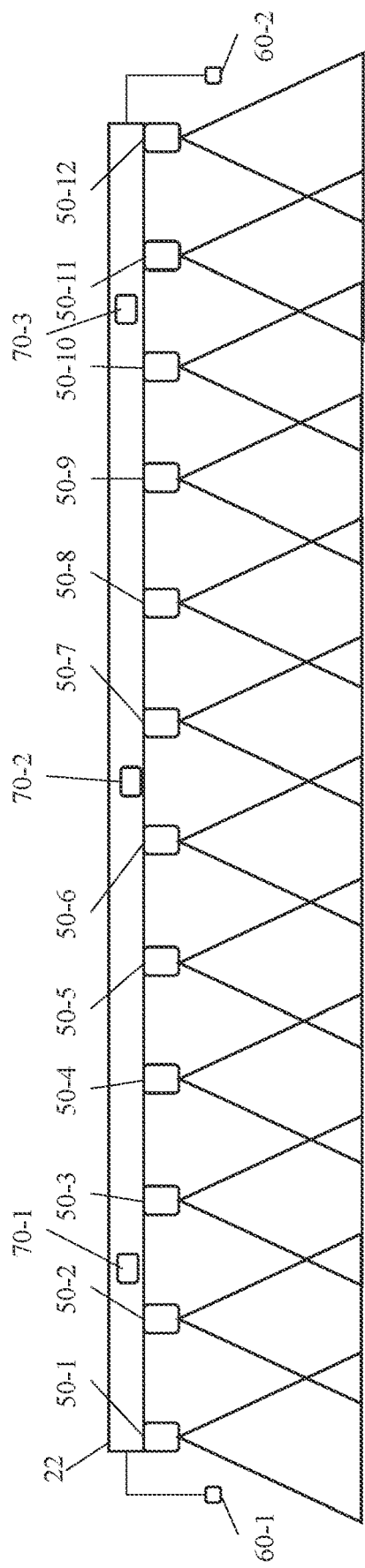
FIG. 7 is a rear elevation view of a spray boom with cameras and lights according to one embodiment.

FIGS. 3 and 7 illustrate two lights 60 (60-1, 60-2) that are disposed at the ends (23, 25) of boom arm 22 and disposed to illuminate towards the middle (24) of boom arm 22.

Figure 4:
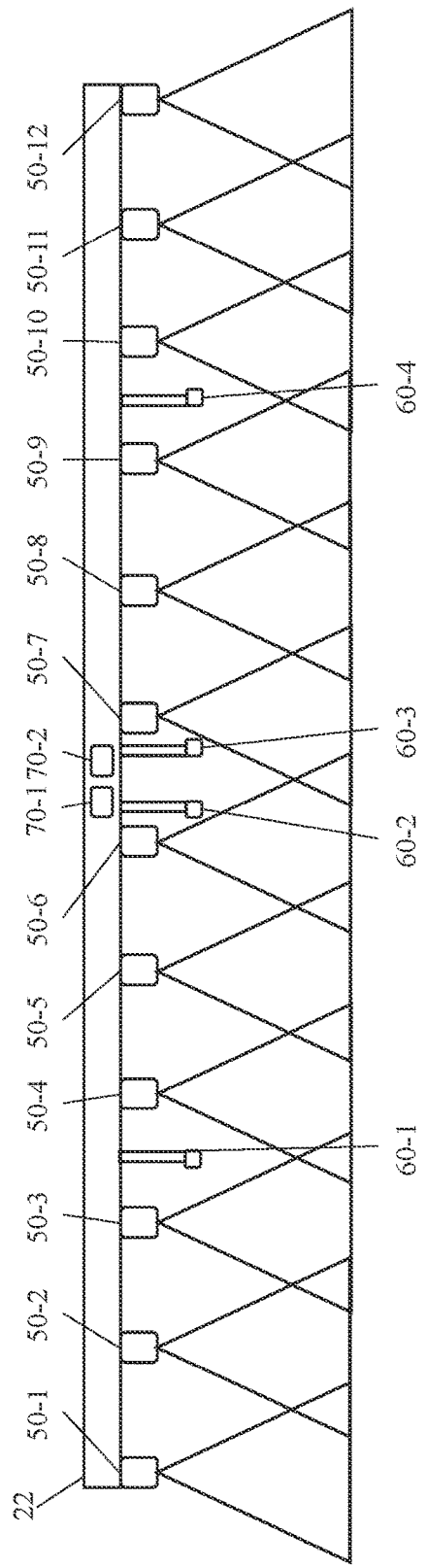
FIG. 4 is a rear elevation view of a spray boom with cameras and lights according to one embodiment.
Figure 8:
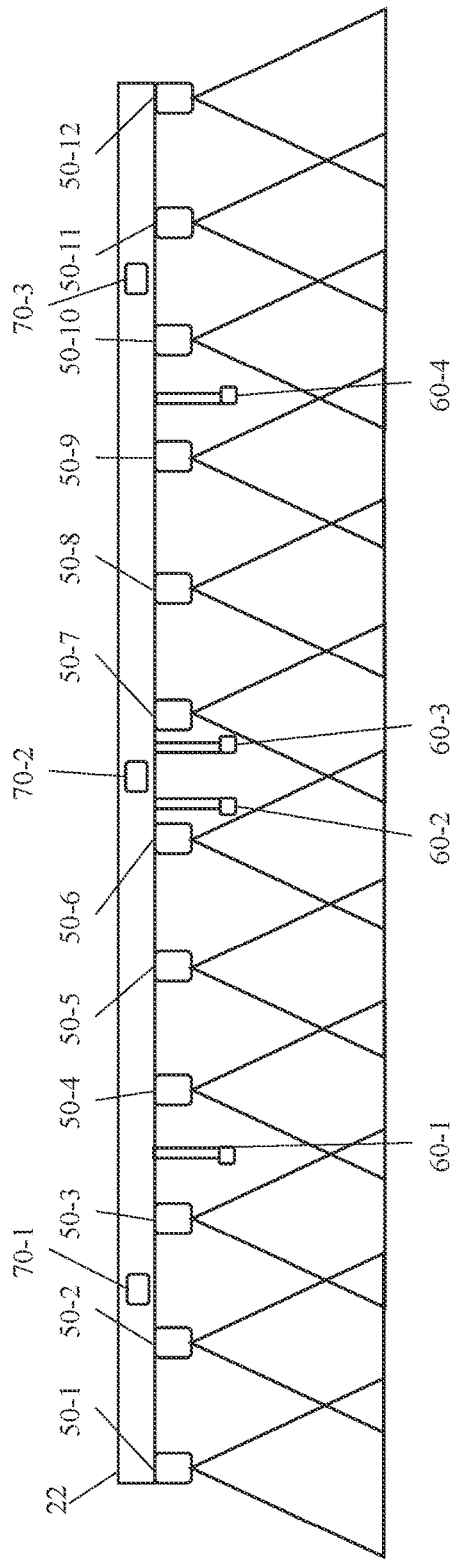
FIG. 8 is a rear elevation view of a spray boom with cameras and lights according to one embodiment.

FIGS. 4 and 8 illustrate a plurality of lights 60 (60-1, 60-2, 60-3, 60-4) that are disposed on boom arm 22 to illuminate a subset of nozzle sprays from nozzles 50. While illustrated with each light 60 illuminating three nozzles 50, the number of nozzles 50 illuminated can range from two to less than less than all nozzles 50.

Figure 5:
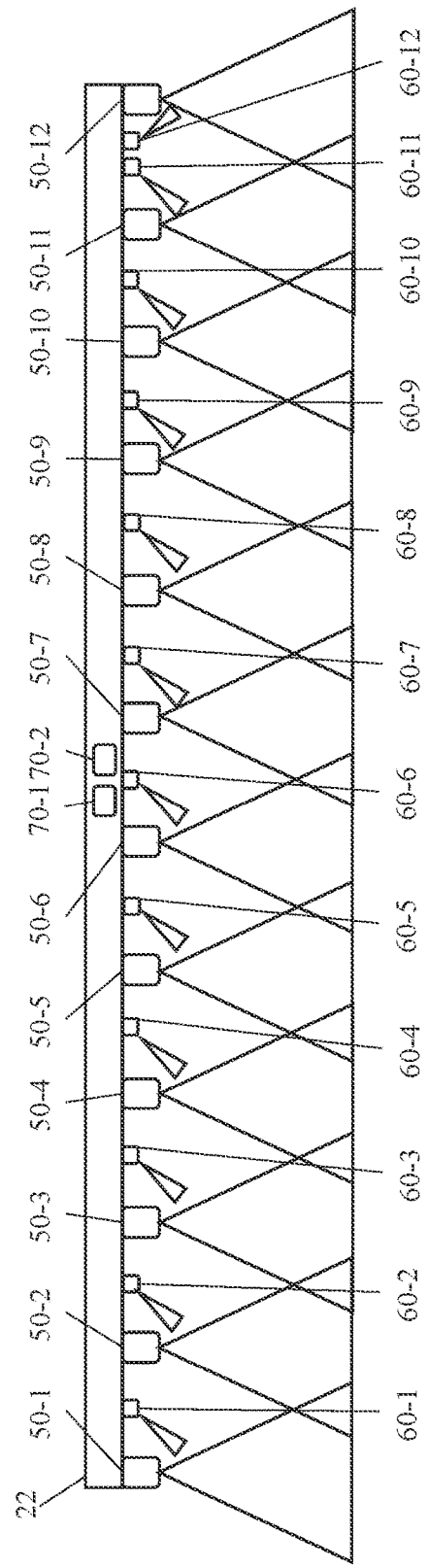
FIG. 5 is a rear elevation view of a spray boom with cameras and lights according to one embodiment.
Figure 9:
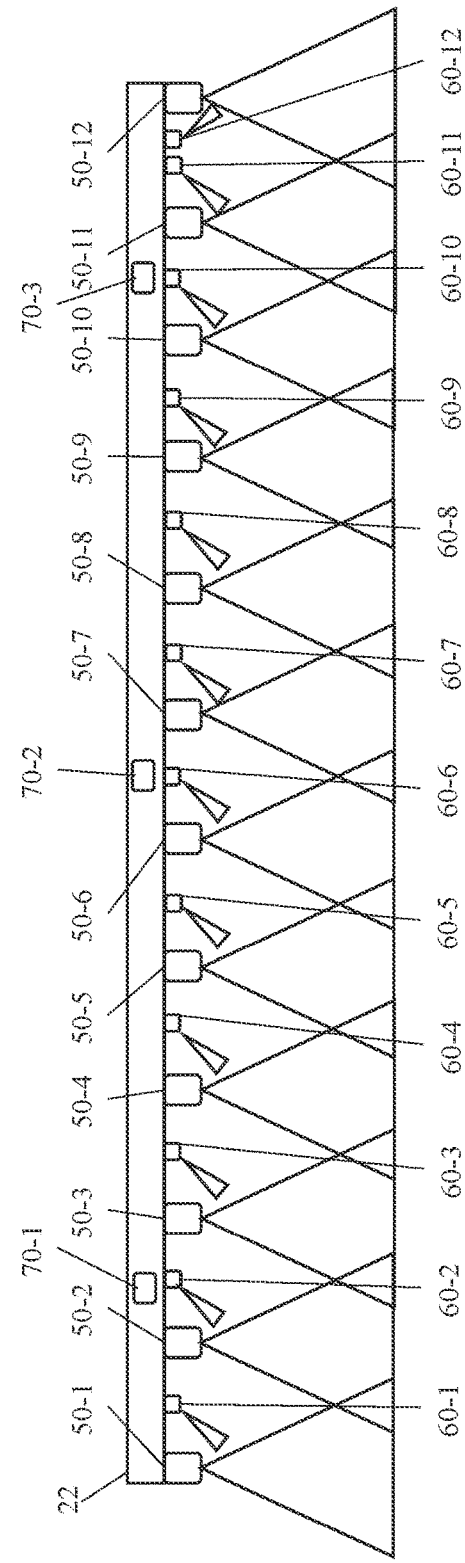
FIG. 9 is a rear elevation view of a spray boom with cameras and lights according to one embodiment.

FIGS. 5 and 9 illustrate a plurality of lights 60 (60-1 to 60-12) that are each disposed to illuminate one nozzle 50.

Figure 10:
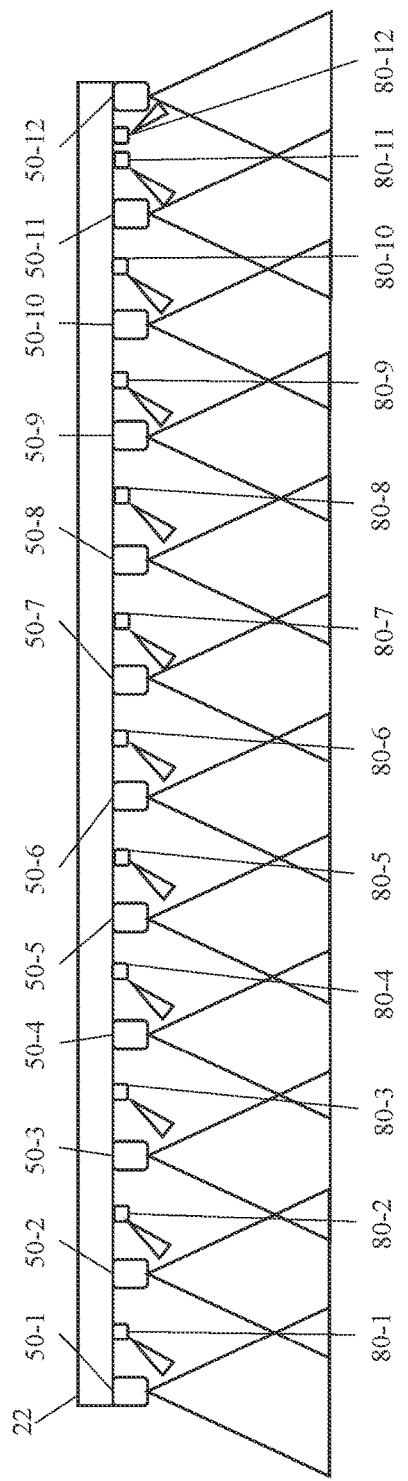
FIG. 10 is a rear elevation view of a spray boom with a combined camera and light according to one embodiment.

FIG. 10 illustrates a combined camera 70 and light 60 unit 80 (80-1 to 80-12). A reference to camera 70 is to either camera 70 or camera/light unit 80 unless otherwise specifically stated.

Camera 70 can be any type of camera. Examples of cameras include, but are not limited to, digital camera, line scan camera, monochrome, RGB (red, green blue), NIR (near infrared), SWIR (short wave infrared), MWIR (medium wave infrared), LWIR (long wave infrared), optical sensor (including receiver or transmitter/receiver), reflectance sensor, laser.

In any of the embodiments, camera 70 can be coordinated with the PWM of the nozzles 50. In one embodiment, camera 70 can capture images when the nozzle 50 is off and when nozzle 50 is on. The off image can be subtracted from the on image to eliminate background light from the image. While any wavelength of the electromagnetic spectrum can be used, in one embodiment, lights 60 can illuminate with blue light. In one embodiment, the wavelength of light from light 60 is in a range of 380-500 nm or 450 to 485 nm. In one embodiment, the frequency of PWM is 10 to 35 Hz.

In one embodiment, the camera 50 and nozzle 70 can be operated at the same frequency. In another embodiment, the cameras 70 can be operated at a different frequency from nozzles 50. Similar to aliasing, the camera can be operated at a frequency less than the nozzle 50 PWM frequency. In one embodiment, camera 70 can capture images at 9 Hz while the nozzles operate at 10 Hz.

In any of the embodiments, the angle of light from light 60 is not directly aligned with a camera 70.

In one embodiment, nozzles 50, lights 60, and cameras 70 are connected to a network. An example of a network is described in PCT Publication No. WO2020/039295A1.

Figure 14:
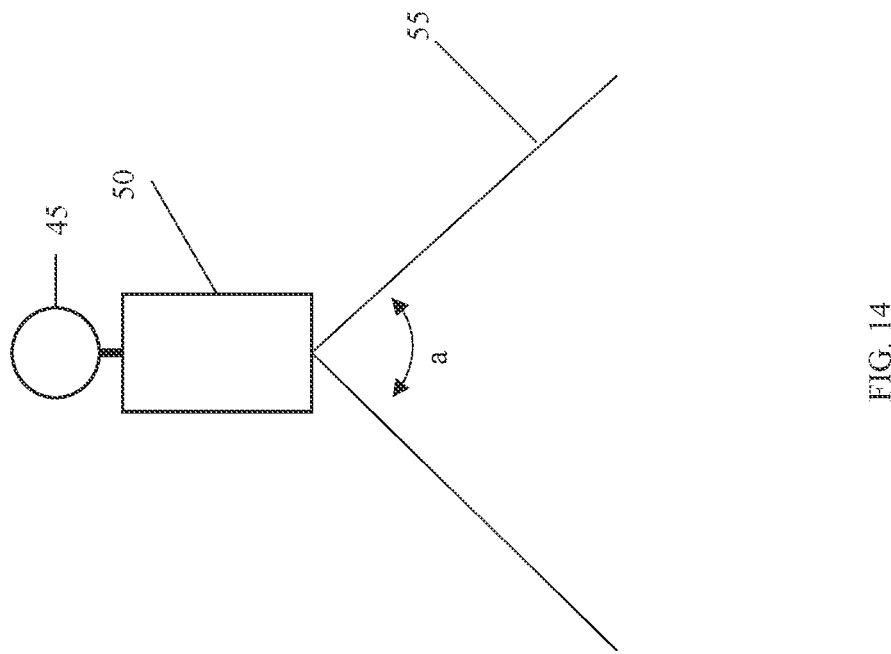
FIG. 14 is side elevation views of a spray pattern from a nozzle.
Figure 13:
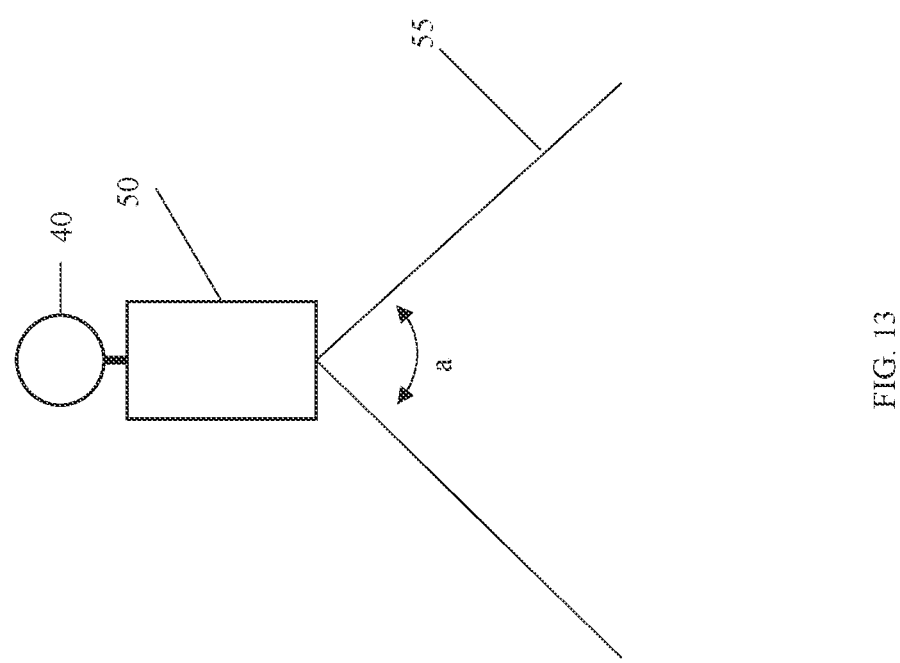
FIG. 13 is side elevation views of a spray pattern from a nozzle.

FIGS. 13 and 14 illustrate a spray pattern 55 from nozzle 50 having a spray angle (a). Spray pattern 55 can be captured in an image from camera 55. The image can be analyzed to determine pattern, uniformity, spray angle (a), and amount of light refracted. In FIG. 13, optional pressure sensor 40 can be installed anywhere before nozzle 50. In FIG. 14, optional flow meter 45 can be installed anywhere before nozzle 50.

Spray angle (a) is a function of nozzle tip geometry, material viscosity, PWM duty cycle, pressure, and flow rate. For a given nozzle spraying a material under a specific duty cycle, these parameters are fixed. Any variation in spray angle (a) is related to changes in pressure or flow rate with one of these being fixed.

In a method, a first image 101 can be taken of one or more spray patterns 55 at a given pressure. The spray angle (a) of each spray pattern 55 can be measured. A second image (102) can be taken of the one or more spray patterns 55 and the spray angle (a) measured. The spray angle (a) from second image 102 is compared to first image 101. From the comparison, it can be determined if the nozzle is plugged (0%) or partially plugged (greater than 0 to less than 100%). The amount of plugging for each nozzle 50 can be displayed on a display (e.g., display 120, 130, or 1230 from WO2020/039295). The plugging can be a numerical amount, a color, or a combination of a color and numerical amount. For color, green can be used for no plugging, yellow for partial plugging, and red for totally plugged.

The absolute pressure at the nozzle 50 can be determined. From operating the nozzle 50 at different pressures and measuring the spray angle (a) of the spray patterns 55, a calibration curve can be created. By comparing the spray angle (a) from the second image (102), a pressure for nozzle 50 can be determined from the calibration curve. Alternatively, a pressure sensor 40 can be installed before one or more nozzles 50 to measure actual flow. A spray angle (a) of a nozzle 50 without a pressure sensor 40 can be compared to a spray angle (a) of a nozzle 50 with the pressure sensor 40. The difference in spray angle (a) provides a percentage difference that is converted to actual by multiplying the percentage difference by the pressure measured from pressure sensor 40. Each successive comparison between nozzles 50 can be based on the current pressure from pressure sensor 40.

The absolute flow rate at the nozzle 50 can be determined. From operating the nozzle 50 at different flow rates and measuring the spray angle (a) of the spray patterns 55, a calibration curve can be created. By comparing the spray angle (a) from the second image (102), a flow rate for nozzle 50 can be determined from the calibration curve. Alternatively, a flow meter 45 can be installed before one or more nozzles 50 to measure actual flow. A spray angle (a) of a nozzle 50 without a flow meter 45 can be compared to a spray angle (a) of a nozzle 50 with the flow meter 45. The difference in spray angle (a) provides a percentage difference that is converted to actual by multiplying the percentage difference by the flow rate measured from flow meter 45. Each successive comparison between nozzles 50 can be based on the current flow rate from flow meter 45.

In another embodiment, a relative pressure for a nozzle can be determined. Instead of comparing a spray angle (a) of a nozzle 50 to a previous image of the sample nozzle 50, the spray angle (a) of one nozzle can be compared with the spray angle (a) of another nozzle 50. The difference in spray angle (a) between the two nozzles 50 provides the percentage of pressure of one nozzle 50 to the other nozzle 50.

In another embodiment, a relative flow rate for a nozzle can be determined. Instead of comparing a spray angle (a) of a nozzle 50 to a previous image of the sample nozzle 50, the spray angle (a) of one nozzle can be compared with the spray angle (a) of another nozzle 50. The difference in spray angle (a) between the two nozzles 50 provides the percentage of flow rate of one nozzle 50 to the other nozzle 50.

In another embodiment, a spray pattern variability can be measured. For a given nozzle 50, multiple images of spray pattern 55 from nozzle 50 are obtained from camera 70. Spray angle (a) from multiple images can be used to calculate an average spray angle (a) for a nozzle 50 and/or a standard deviation for spray angle (a). A spray pattern uniformity/variability can be calculated based on a percentage of spray angles (a) over a given time period that are within a given percentage of average or standard deviation. Uniformity can be displayed as a numeric value and/or as a color, such as green, yellow, or red, with each successive color representing a larger deviation from the average and/or standard deviation. In one embodiment, green can represent a uniformity of at least 80%, at least 90%, at least 95%, or at least 99%. Red can represent uniformity less than 50%, less than 40%, less than 30%, less than 25%, less than 20%, or less than 10%. Yellow can represent a uniformity that is not any of the green uniformity values and not any of the red uniformity values.

Any of the above measured parameters, such as spray angle (a), average of spray angle (a), standard deviation of spray angle (a), relative pressure, absolute pressure, relative flow rate, absolute flow rate, percent plugged, and/or spray pattern uniformity/variability, can be displayed on display 120, 130, or 1230. The parameters can be displayed as numeric values, mapped on the display, or both. The parameters can be displayed in split view with the applied flow rate and/or applied pressure.

EXAMPLES

The following are non-limiting examples.

Example 1—a spraying system including a boom (22) having a first end, a middle (24), and a second end (25); a plurality of nozzles (50) disposed on the boom (22); a plurality of cameras (70) disposed on the boom (22) and positioned to each view a subset of the plurality of nozzles (50); a plurality of lights (60) disposed on the boom (22) and positioned to each illuminate a subset of the plurality of nozzles (50).

Example 2—the spraying system of Example 1, wherein the plurality of cameras (70) comprises two cameras (70) disposed at the middle (24) of the boom (22) and each positioned to view half of the boom (22).

Example 3—the spraying system of Example 1, wherein the plurality of cameras (70) comprises at least three cameras (70) with each camera (70) disposed to view a subsection of the boom (22).

Example 4—the spraying system of Example 3, wherein each camera (70) is disposed to view an equal number of nozzles (50).

Example 5—the spraying system of any of Examples 1 to 4, wherein the plurality of lights (60) comprises a first light (60) and a second light (60) disposed at the middle (24) of the boom (22) with the first light (60) positioned to illuminate from the middle (24) of the boom (22) towards the first end (23) of the boom (22) and with the second light (60) positioned to illuminate from the middle (24) of the boom (22) towards the second end (25) of the boom (22).

Example 6—the spraying system of any of Examples 1 to 4, wherein the plurality of lights (60) comprises two lights (60) with one light (60) disposed at the first end (23) of the boom (22) and the second light (60) disposed at the second end (25) of the boom (22) with the first light (60) positioned to illuminate from the first end (23) of the boom (22) towards the middle (24) of the boom (22), and the second light (60) positioned to illuminated from the second end (25) of the boom (22) towards the middle (24).

Example 7—the spraying system of any of Examples 1 to 4, wherein a number of lights (60) is equal to a number of nozzles (50), and each light (60) is disposed to illuminate one nozzle (50).

Example 8—the spraying system of Example 1, wherein the plurality of cameras (70) comprises two cameras (70) disposed at the middle (24) of the boom (22) and each positioned to view half of the boom (22) and wherein a number of lights (60) is equal to a number of nozzles (50), and each light (60) is disposed to illuminate one nozzle (50).

Example 101—A method for measuring performance of a spray nozzle (50) comprising: obtaining an image of a first spray angle (a) from a first nozzle (50) and a second spray angle (a) from a second nozzle (50); measuring a difference between the first spray angle (a) and the second spray angle (a).

Example 102—the method of Example 101, wherein the image contains the first spray angle (a) and the second spray angle (a).

Example 103—the method of Example 101, wherein the first spray angle (a) is in a first image from a first camera (70, 80) and the second spray angle (a) is in a second image from a second camera (70, 80).

Example 104—the method of any of Examples 101 to 103 further comprising a flow meter 45 disposed before the first nozzle (50).

Example 105—the method of any of Examples 101 to 104 further comprising a pressure sensor 40 disposed before the first nozzle (50).

Example 106—the method of any of Examples 101 to 105 further comprising calculating a relative flow rate of the second nozzle (50) compared to the first nozzle (50).

Example 107—the method of any of Examples 101 to 106 further comprising calculating an absolute flow rate of the second nozzle (50).

Example 108—the method of any of Examples 101 to 107 further comprising calculating a relative pressure of the second nozzle (50) compared to the first nozzle (50).

Example 109—the method of any of Examples 101 to 108 further comprising calculating an absolute pressure of the second nozzle (50).

Example 110—the method of any of Examples 101 to 109 further comprising obtaining subsequent images and calculating an average spray angle (a).

Example 111—the method of any of Examples 101 to 110 further comprising obtaining subsequent images and calculating a standard deviation of spray angle (a).

Example 112—the method of any of Examples 101 to 111 further comprising calculating a percentage plugged for the first nozzle (50) and/or the second nozzle (50).

Example 113—the method of any of Examples 101 to 112 further comprising calculating a spray pattern (55) uniformity for the first nozzle (50) and/or the second nozzle (50).

Example 114—A method for measuring performance of a spray nozzle (50) comprising: obtaining a first image of a spray angle (a) from at least one nozzle (50); obtaining a second image of the spray angle (a) from the at least one nozzle (50); measuring a difference between the spray angle (a) from the second image and the spray angle (a) of the first image.

Example 115—the method of Example 114, wherein the first image is taken at a known pressure and/or flow rate.

Example 116—the method of Example 115 further comprising calculating a relative flow rate of the second nozzle (50) compared to the first nozzle (50).

Example 117—the method of any of Examples 114 to 116 further comprising calculating an absolute flow rate of the second nozzle (50).

Example 118—the method of any of Examples 115 to 117 further comprising calculating a relative pressure of the second nozzle (50) compared to the first nozzle (50).

Example 119—the method of any of Examples 114 to 118 to further comprising obtaining subsequent images and calculating an average spray angle (a).

Example 120—the method of any of Examples 114 to 119 further comprising obtaining subsequent images and calculating a standard deviation of spray angle (a).

Example 121—the method of any of Examples 114 to 120 further comprising calculating a percentage plugged for the at least one nozzle (50).

Example 122—the method of any of Examples 114 to 121 further comprising calculating a spray pattern (55) uniformity for the at least one nozzle (50).

Example 123—the method of any of Examples 101 to 122 further comprising displaying the calculation on a display at least one of numerically, graphically, and split screen with additional information.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A method for measuring performance of a spray nozzle comprising:
    obtaining an image of a first spray angle from a first spray nozzle and a second spray angle from a second spray nozzle, the first spray nozzle and second spray nozzle being mounted on a spray boom of an agricultural crop sprayer, the agricultural crop sprayer including a liquid storage tank for storing a spray liquid to be sprayed on a field and the spray boom for distributing the spray liquid over the field through at least the first spray nozzle and the second spray nozzle as the agricultural crop sprayer moves through the field, wherein obtaining the image of the first spray angle and the second spray angle is performed while the agricultural crop sprayer moves through the field;
    measuring a difference between the first spray angle and the second spray angle;
    determining a flow rate at a first one of the first spray nozzle and the second spray nozzle by comparing the spray angle from the first one of the first spray nozzle and the second spray nozzle with a calibration curve or by using a flow meter installed before the first one of the first spray nozzle and the second spray nozzle; and
    calculating an absolute flow rate of a second one of the first spray nozzle and the second spray nozzle using the difference between the first spray angle and the second spray angle.

2. The method of claim 1, wherein the image contains the first spray angle and the second spray angle.

3. The method of claim 1, wherein the first spray angle is in a first image from a first camera and the second spray angle is in a second image from a second camera.

4. The method of claim 1 further comprising calculating a relative pressure of the second spray nozzle compared to the first spray nozzle.

5. The method of claim 1 further comprising calculating an absolute pressure of the second spray nozzle.

6. The method of claim 1 further comprising obtaining subsequent images and calculating an average spray angle using the subsequent images.

7. The method of claim 1 further comprising obtaining subsequent images and calculating a standard deviation of spray angle using the subsequent images.

8. The method of claim 1 further comprising calculating a percentage plugged for the first spray nozzle and/or the second spray nozzle.

9. The method of claim 1 further comprising calculating a spray pattern uniformity for the first spray nozzle and/or the second spray nozzle.

10. The method of claim 1 further comprising displaying the calculation on a display at least one of numerically, graphically, and split screen with additional information.

11. A method for measuring performance of a spray nozzle comprising:
    obtaining a first image of a spray angle from at least one spray nozzle, the first image being taken at a known flow rate, the spray nozzle being mounted on a spray boom of an agricultural crop sprayer, the agricultural crop sprayer including a liquid storage tank for storing a spray liquid to be sprayed on a field and the spray boom for distributing the spray liquid over the field through at least the spray nozzle as the agricultural crop sprayer moves through the field, wherein obtaining the first image of the first spray angle is performed while the agricultural crop sprayer moves through the field;
    obtaining a second image of the spray angle from the at least one spray nozzle;
    measuring a difference between the spray angle from the second image and the spray angle of the first image; and
    calculating an absolute flow rate of the at least one spray nozzle in the second image using the difference between the spray angle from the second image and the spray angle from the first image.

12. The method of claim 11 further comprising calculating a relative flow rate of the at least one spray nozzle in the second image compared to the first image.

13. The method of claim 11 further comprising calculating a relative pressure of the at least one spray nozzle in the second image compared to the first image.

14. The method of claim 11 to further comprising obtaining subsequent images and calculating an average spray angle.

15. The method of claim 11 further comprising obtaining subsequent images and calculating a standard deviation of spray angle.

16. The method of claim 11 further comprising calculating a percentage plugged for the at least one spray nozzle.

17. The method of claim 11 further comprising calculating a spray pattern uniformity for the at least one spray nozzle.

18. The method of claim 11 further comprising displaying the difference on a display at least one of numerically, graphically, and split screen with additional information.

* * * * *